United States Patent
Wang et al.

(10) Patent No.: US 12,442,704 B2
(45) Date of Patent: Oct. 14, 2025

(54) DEVICE AND METHOD FOR TESTING TEMPERATURE CONDUCTION AND FROST-HEAVING STRAIN OF CONCRETE LINING CANAL

(71) Applicant: Inner Mongolia University of Technology, Hohhot (CN)

(72) Inventors: Xiaoxiao Wang, Hohhot (CN); Shuguang Liu, Hohhot (CN); Changwang Yan, Hohhot (CN); Yufei Dong, Hohhot (CN)

(73) Assignee: Inner Mongolia University of Technology, Hohhot (CN)

( * ) Notice: Subject to any disclaimer, the term of this patent is extended or adjusted under 35 U.S.C. 154(b) by 620 days.

(21) Appl. No.: 17/892,057

(22) Filed: Aug. 20, 2022

(65) Prior Publication Data

US 2023/0280226 A1    Sep. 7, 2023

(30) Foreign Application Priority Data

Mar. 7, 2022    (CN) .......................... 202210224153.9

(51) Int. Cl.

| | |
|---|---|
| *G01L 11/02* | (2006.01) |
| *G01B 11/16* | (2006.01) |
| *G01K 3/14* | (2006.01) |
| *G01K 11/3206* | (2021.01) |
| *G01L 1/24* | (2006.01) |

(Continued)

(52) U.S. Cl.
CPC .......... *G01L 11/025* (2013.01); *G01B 11/16* (2013.01); *G01K 3/14* (2013.01); *G01K 11/3206* (2013.01); *G01L 1/246* (2013.01); *G01N 25/16* (2013.01); *G01N 25/20* (2013.01); *G01N 25/14* (2013.01)

(58) Field of Classification Search
CPC ....... G01L 11/025; G01L 1/246; G01B 11/16; G01K 3/14; G01K 11/3206; G01N 25/16; G01N 25/20; G01N 25/14
See application file for complete search history.

(56) References Cited

U.S. PATENT DOCUMENTS

| | | | |
|---|---|---|---|
| 5,041,987 A * | 8/1991 | Kuwahara | G01N 33/383 374/53 |
| 7,052,174 B2 * | 5/2006 | Korhonen | G01N 33/383 374/57 |

(Continued)

*Primary Examiner* — Laura Martin
*Assistant Examiner* — Philip L Cotey
(74) *Attorney, Agent, or Firm* — Bayramoglu Law Offices LLC

(57) ABSTRACT

A device for testing temperature conduction and frost-heaving strain of a concrete lining canal comprises: a frost-heaving device comprising a lining canal body and a temperature control device, the temperature control device being configured to provide a predetermined temperature for the lining canal body; a detection device comprising a transverse deformation detection device, a vertical deformation detection device and a plurality of temperature sensors, the transverse deformation detection device being configured to detect a transverse frost-heaving strain parameter of the lining canal body, and the plurality of temperature sensors being arranged along an axial direction of the lining canal body, being embedded inside the lining canal body and being configured to detect temperature conduction performance of the lining canal body.

9 Claims, 1 Drawing Sheet

(51) Int. Cl.
 *G01N 25/16* (2006.01)
 *G01N 25/20* (2006.01)
 *G01N 25/14* (2006.01)

(56) References Cited

U.S. PATENT DOCUMENTS

| | | | |
|---|---|---|---|
| 11,408,807 B2* | 8/2022 | Wang | G01N 3/54 |
| 2006/0056483 A1* | 3/2006 | Korhonen | G01N 33/383 |
| | | | 374/7 |
| 2008/0202220 A1* | 8/2008 | Schmidt | G01N 25/56 |
| | | | 73/75 |
| 2016/0161383 A1* | 6/2016 | Lowitz | G01B 5/30 |
| | | | 156/64 |
| 2017/0074744 A1* | 3/2017 | Takeda | G01M 3/002 |
| 2019/0265015 A1* | 8/2019 | Michiwaki | G01B 7/16 |
| 2020/0209127 A1* | 7/2020 | Wang | G01N 3/42 |
| 2021/0003522 A1* | 1/2021 | McCall | G01N 25/20 |
| 2022/0276102 A1* | 9/2022 | Bivolarsky | G01K 11/24 |
| 2022/0308038 A1* | 9/2022 | Bao | G01N 33/383 |
| 2022/0381687 A1* | 12/2022 | Okkonen | G01N 21/8507 |

* cited by examiner

DEVICE AND METHOD FOR TESTING TEMPERATURE CONDUCTION AND FROST-HEAVING STRAIN OF CONCRETE LINING CANAL

CROSS REFERENCE TO THE RELATED APPLICATIONS

This application is based upon and claims priority to Chinese Patent Application No. 202210224153.9 filed on Mar. 7, 2022, the entire contents of which are incorporated herein by reference.

TECHNICAL FIELD

The present invention relates to the technical field of low-temperature tests of materials, in particular to a device and a method for testing temperature conduction and frost-heaving strain of a concrete lining canal.

BACKGROUND

Hetao area in Inner Mongolia is located in a severe cold region in Northern China, with a minimum temperature in winter reaching −25° C. Canals are widely distributed in Hetao area, which play an important role in crop irrigation and water transportation. Ambient temperature in the severe cold region decreases, which results in a temperature difference between lining concrete and a canal base soil, and causes a heat loss of the base soil. Under a low temperature condition, the canal base soil freezes and forms a frozen soil layer. The increase of soil body volume generates a frost-heaving force on lining, jacking up or capping the lining, resulting in a frost-heaving damage of a lining canal. Therefore, temperature conduction performance of a lining canal body has a significant impact on its frost heaving. However, due to the harsh field operation environment, a data collection efficiency is low and an instrument is easy to be damaged, so the test is difficult and the cost is high. On this basis, it is necessary to develop a device which may not only effectively simulate the real environment but also carry out a combined test on the temperature conduction performance and the frost-heaving strain of the lining canal body for auxiliary research.

However, a conventional testing device for concrete temperature conduction performance may only use a surface temperature gradient of a concrete sample as a measurement parameter, and may not carry out a quantitative analysis to an internal temperature conduction process of the lining canal body. In addition, due to a strict testing environment required for the test, the conventional testing device may not flexibly adjust an environmental parameter, and can not carry out an effective simulation to an actual engineering environment, resulting in difficulty in applying to the lining engineering field. In addition, the existing frost-heaving strain measuring technology in the lining engineering field is lack of the quantitative analysis to the internal temperature conduction process of the lining canal body, and basically only measures and determines a vertical frost-heaving amount of the lining canal body without considering a transverse frost-heaving strain; thus, there is still a certain room for improvement in the prior art in this field.

Therefore, how to provide a device and a method for testing temperature conduction and frost-heaving strain of a concrete lining canal which may carry out a quantitative analysis to an internal temperature conduction process of a lining canal body and integrally measuring and determining the lining canal body is one of the technical problems to be solved urgently in this field.

SUMMARY

In view of this, the present invention provides a device and a method for testing temperature conduction and frost-heaving strain of a concrete lining canal, which is to provide a solution to the above defects.

In order to solve the above technical problem, the present invention adopts the following technical solution:

a device for testing temperature conduction and frost-heaving strain of a concrete lining canal comprises: a frost-heaving device comprising a lining canal body and a temperature control device, the temperature control device being configured to provide a predetermined temperature for the lining canal body; a detection device comprising a transverse deformation detection device, a vertical displacement detection device and a plurality of temperature sensors; the transverse deformation detection device being configured to detect a transverse frost-heaving strain parameter of the lining canal body at the predetermined temperature; the vertical displacement detection device being configured to detect a vertical frost-heaving strain parameter of the lining canal body at the predetermined temperature; the plurality of temperature sensors being arranged along an axial direction of the lining canal body, being embedded inside the lining canal body, and being configured to detect temperature conduction performance of the lining canal body at the predetermined temperature.

Preferably, the temperature control device is a refrigeration box; the two temperature control devices are an upper temperature-changing box and a lower temperature-changing box, the upper temperature-changing box and the lower temperature-changing box are tightly fixed at an upper end and a lower end of the lining canal body, respectively.

Preferably, a displacement-constraint device is connected between the upper temperature-changing box and the lower temperature-changing box; the displacement-constraint device comprises: a first connecting rod, a second connecting rod and a sliding rod; a first end of the first connecting rod is fixedly connected to the lower temperature-changing box, and a second end of the first connecting rod is fixedly connected to a first end of the sliding rod; a first end of the second connecting rod is fixedly connected to the upper temperature-changing box, and a second end of the second connecting rod is slidably connected to a second end of the sliding rod.

Preferably, the transverse deformation detection device comprises: a plurality of groups of single-mode bend-insensitive optical fibers, a temperature compensation device and a Fiber Bragg Grating (FBG) demodulator; the plurality of groups of single-mode bend-insensitive optical fibers are tightly sleeved on an overall outside of the lining canal body, and the plurality of groups of single-mode bend-insensitive optical fibers are electrically connected to the FBG demodulator; the temperature compensation device is arranged inside the lining canal body and is electrically connected to the FBG demodulator.

Preferably, the vertical displacement detection device comprises: a supporting rod and a fixing rod; a first end of the fixing rod is fixedly connected to a top end of the supporting rod; a second end of the fixing rod is provided with a displacement sensor 321, and the displacement sensor 321 is abutted against and fitted with a top end of the upper temperature-changing box.

The present invention further discloses a method for testing temperature conduction and frost-heaving strain of a concrete lining canal, comprising:

S1, performing an initial detection, specifically comprising:

detecting, by the FBG demodulator, an initial center wavelength $\lambda_B$ of a pre-tightening force of the plurality of groups of single-mode bend-insensitive optical fibers sleeved on the lining canal body;

detecting, by the plurality of temperature sensors, an initial temperature of the lining canal body;

S2, configuring the temperature control device to provide a predetermined temperature for the lining canal body, specifically comprising:

performing, by the upper temperature-changing box and the lower temperature-changing box, refrigeration to provide a predetermined temperature for the upper end and the lower end of the lining canal body;

S3, detecting after temperature changing, specifically comprising:

detecting, by the plurality of temperature sensors, a temperature change $\Delta T_i$ of different regions of the lining canal body;

detecting, by the FBG demodulator, a central wavelength changing value $\Delta \lambda_{Bi}$ of the plurality of groups of single-mode bend-insensitive optical fibers caused by the temperature changing;

detecting, by the FBG demodulator, a strain changing value $\varepsilon_i$ of the plurality of groups of single-mode bend-insensitive optical fibers;

S4, obtaining a frost-heaving strain parameter:

calculating a frost-heaving strain of an optical fiber:

$$\frac{\Delta \lambda_{Bi}}{\lambda_B} = (\alpha + \xi)\Delta T_i + (1 - p_e)\varepsilon_i$$

wherein $\varepsilon_i$ is a detection value of the transverse frost-heaving strain of the single-mode bend-insensitive optical fibers (211) in different regions, $\alpha$ is a thermal expansion coefficient of the single-mode bend-insensitive optical fiber, $\xi$ is a thermo-optic coefficient of the single-mode bend-insensitive optical fiber, and $p_e$ is an effective photoelastic coefficient of the single-mode bend-insensitive optical fiber;

a transverse frost-heaving strain $\varepsilon_{ai}$:

$$\varepsilon_{ai} = \varepsilon_i - \varepsilon'$$

wherein $\varepsilon_{ai}$ is an actual value of the transverse frost-heaving strain of the lining canal body (11) in different regions, $\varepsilon_i$ is the detection value of the frost-heaving strain of the single-mode bend-insensitive optical fiber (211) in different regions, and $\varepsilon'$ is an error value detected by the temperature compensation device (212);

obtaining a vertical frost-heaving strain parameter of the lining canal body (11) by the displacement sensor 321 provided at the second end of the fixing rod (32).

Compared with the prior art, the present invention achieves the following technical effects:

The plurality of temperature sensors are arranged along the axial direction of the lining canal body and are embedded inside the lining canal body, and the transverse deformation detection device detects deformation of the lining canal body, which can achieve the technical effects of carrying out a quantitative analysis to an internal temperature conduction process of the lining canal body and integrally measuring and determining the lining canal body;

The displacement sensor 321 is abutted against and fitted with the top end of the upper temperature-changing box, so that the vertical displacement of the lining canal body after frost heaving may be effectively detected; and combined with the single-mode bend-insensitive optical fiber being wound on a side wall of the lining canal body, the transverse displacement of the lining canal body after the frost heaving may be effectively detected;

The present invention may simulate the ambient temperature at which the lining canal is, the surface temperature of the lining and the temperature of the canal base soil in a cold region.

Figure 1:
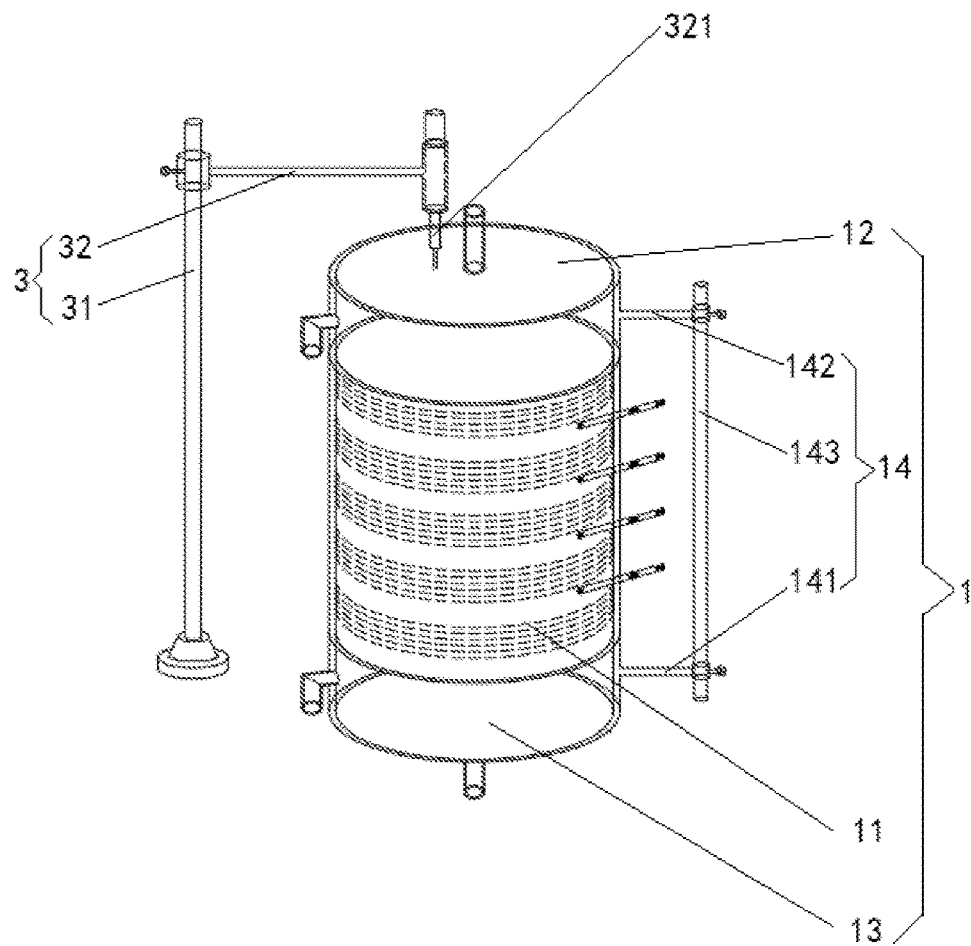
FIG. 1 is a schematic structural diagram of the device for testing temperature conduction and frost-heaving strain of a concrete lining canal according to the present invention.

In the drawing: 1—frost-heaving device; 11—lining canal body; 12—upper temperature-changing box; 13—lower temperature-changing box; 14—displacement-constraint device; 141—first connecting rod; 142—second connecting rod; 143—sliding rod;

2—detection device; 21—transverse deformation detection device; 211—single-mode bend-insensitive optical fiber; 212—temperature compensation device; 2121—temperature compensation grating optical fiber; 2122—protective shell; 213—FBG demodulator; 22—temperature sensor;

3—vertical displacement detection device; 31—supporting rod; 32—fixing rod; 321—displacement sensor.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those skilled in the art without creative work shall fall within the protection scope of the present invention.

EMBODIMENTS

Figure 2:
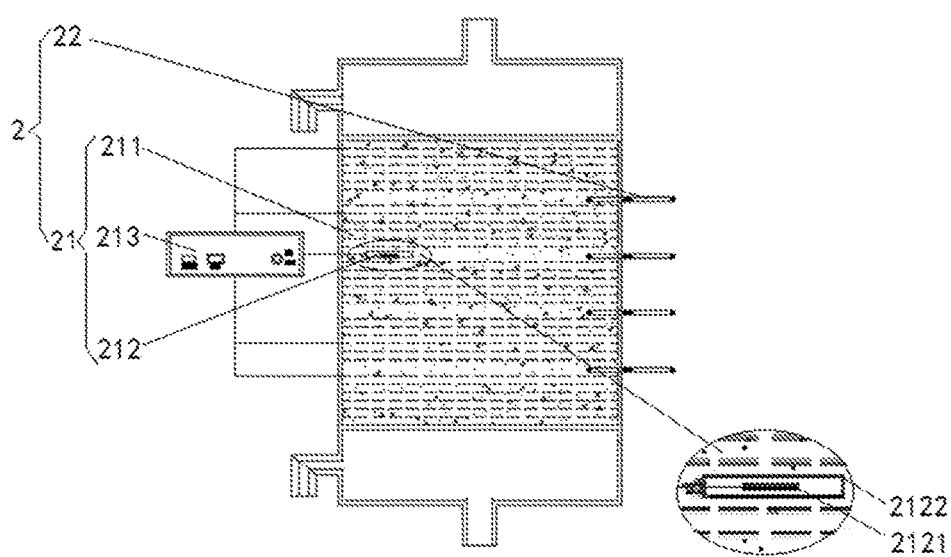
FIG. 2 is a schematic cross-sectional diagram of a frost-heaving device of the device for testing temperature conduction and frost-heaving strain of a concrete lining canal according to the present invention.

Referring to a device for testing temperature conduction and frost-heaving strain of a concrete lining canal shown in FIGS. 1-2, the testing device is placed in a closed test box, and the closed test box thereof may balance and control temperature through air forced circulation. The testing device comprises: a frost-heaving device 1 and a detection device 2, wherein the frost-heaving device 1 comprises a lining canal body 11, an upper temperature-changing box 12 and a lower temperature-changing box 13, the upper temperature-changing box 12 and the lower temperature-changing box 13 are tightly fixed at an upper end and a lower end of the lining canal body 11, respectively, and are configured to provide a predetermined temperature for the lining canal body 11.

Among them, the upper temperature-changing box 12 and the lower temperature-changing box 13 are both water storage barrels, and the upper temperature-changing box 12 and the lower temperature-changing box 13 are both provided with water inlets and water outlets for cooling medium circulation, so that a cooling rate may be controlled by controlling flow of circulation cooling medium, and the upper temperature-changing box 12 and the lower temperature-changing box 13 are kept at a lower temperature all the time, thus ensuring that the upper end and the lower end of the lining canal body 11 are in a low temperature state.

A material of the closed test box is preferably a cold-rolled steel plate. An air circulation device is provided by a centrifugal blower. A condensation mode is air cooling, and a heating mode is electric heating wire heating.

A cooling medium is preferably an anhydrous ethanol with a temperature-resistant range of −70° C. to 160° C., and a pipeline for conveying the anhydrous ethanol is preferably selected from a high-quality silicone tube with an advantage of being not frozen and cracked at a low temperature, so as to ensure the conveying of the anhydrous ethanol.

The detection device 2 comprises a transverse deformation detection device 21 and four temperature sensors 22, wherein the transverse deformation detection device 21 is configured to detect a transverse frost-heaving strain parameter of the lining canal body 11, and the four temperature sensors 22 are arranged along an axial direction of the lining canal body 11, embedded inside the lining canal body 11 and configured to detect temperature conduction performance of the lining canal body 11.

Among them, holes are drilled in the lining canal body 11 every 20 mm, the temperature sensor 22 is mounted, and the temperature sensor 22 has an insertion depth of 30 mm.

The transverse deformation detection device 21 comprises: five groups of single-mode bend-insensitive optical fibers 211, a temperature compensation device 212 and an FBG demodulator 213, wherein the five groups of single-mode bend-insensitive optical fibers 211 are tightly sleeved on an overall outside of the lining canal body 11, and the five groups of single-mode bend-insensitive optical fibers 211 are electrically connected to the FBG demodulator 213. The temperature compensation device 212 is arranged inside the lining canal body 11 and is electrically connected to the FBG demodulator 213.

The five groups of single-mode bend-insensitive optical fibers 211 are arranged along the axial direction of the lining canal body 11, a certain distance is kept among the five groups of single-mode bend-insensitive optical fibers 211, an initial center wavelength of a pre-tightening force generated by each group of single-mode bend-insensitive optical fiber 211 on the lining canal body 11 is $\lambda_B$, and a tension strain applied by the group of single-mode bend-insensitive optical fiber 211 is not less than 350με.

The five groups of single-mode bend-insensitive optical fibers 211 and the four temperature sensors 22 are arranged in an interleaved manner, the lining canal body 11 is placed in an environment simulation device, and a central wavelength change $\Delta\lambda_{Bi}$ of each section of single-mode bend-insensitive optical fiber 211 is collected by the FBG demodulator.

The temperature compensation device 212 comprises a temperature compensation grating optical fiber 2121 and a protective shell 2122, wherein the protective shell 2122 seals and wraps the temperature compensation grating optical fiber 2121, and the temperature compensation grating optical fiber 2121 is electrically connected to the FBG demodulator 213. The single-mode bend-insensitive optical fiber 211 may generate a certain self-strain at the low temperature, and a self-strain amount ε' of the single-mode bend-insensitive optical fiber 211 at the low temperature is measured by using the temperature compensation grating optical fiber 2121.

A material of the protective shell 2122 is preferably Polyvinyl Chloride (PVC), and the protective shell 2122 may prevent the temperature compensation grating optical fiber 2121 from being damaged by cement. Moreover, the temperature compensation grating optical fiber 2121 is coated with epoxy resin to achieve effects of waterproof and pasting.

In order to protect the single-mode bend-insensitive optical fiber 211 from being influenced by external uncertain factors in a test process and ensure that the single-mode bend-insensitive optical fiber may be normally used, a mortar protective layer with a thick of 5 mm is uniformly wrapped outside the lining canal body 11, and the mortar protective layer is also wrapped outside the single-mode bend-insensitive optical fiber.

A displacement-constraint device 14 is connected between the upper temperature-changing box 12 and the lower temperature-changing box 13, and the displacement-constraint device 14 comprises: a first connecting rod 141, a second connecting rod 142 and a sliding rod 143. A first end of the first connecting rod 141 is fixedly connected to the lower temperature-changing box 13, and a second end of the first connecting rod 141 is fixedly connected to a first end of the sliding rod 143. A first end of the second connecting rod 142 is fixedly connected to the upper temperature-changing box 12, and a second end of the second connecting rod 142 is slidably connected to a second end of the sliding rod 143.

According to the present invention, the lower temperature-changing box 13 is fixed by using the sliding rod 143 and the first connecting rod 141, and the upper temperature-changing box 12 slides on the sliding rod 143 by the second connecting rod 142, so that the upper temperature-changing box 12 and the lower temperature-changing box 13 may be kept in a vertical position to avoid horizontal dislocation.

Among them, a height of the sliding rod 143 is 1.5-1.8 times of that of the upper temperature-changing box 12, and the sliding rod 143 is far higher than the upper temperature-changing box 12, so that a refrigeration box 12 may be prevented from falling off from a top end of the sliding rod 143 in an ascending process of the refrigeration box 12.

The device for testing temperature conduction performance and frost-heaving of a concrete lining canal disclosed by the present invention further comprises: a vertical displacement detection device 3, the vertical displacement detection device 3 comprises: a supporting rod 31 and a fixing rod 32, a first end of the fixing rod 32 is fixedly connected to a top end of the supporting rod 31, a second end of the fixing rod 32 is provided with a displacement sensor 321, and the displacement sensor 321 is abutted against and fitted with a top end of the upper temperature-changing box 12.

When frost heave occurs in the lining canal body 11, the displacement sensor 321 is provided with a squeezing force in a vertical direction, so as to measure the vertical displacement of the frost heave of the lining canal body 11. The single-mode bend-insensitive optical fiber 211 monitors strain when transverse deformation occurs.

Among them, a position of the fixing rod 32 fixed at the supporting rod 31 may be adjusted, so that the vertical displacement detection device 3 may test the vertical displacement of lining canal bodies 11 with different sizes.

The present invention further discloses a method for testing temperature conduction and frost-heaving strain of a concrete lining canal, comprising:

S1, performing an initial detection, specifically comprising:

detecting, by the FBG demodulator 213, an initial center wavelength $\lambda_B$ of a pre-tightening force of five groups of single-mode bend-insensitive optical fibers 211 sleeved on the lining canal body 11, to ensure that the bend-insensitive optical fiber is tightly attached to a test sample of a lining canal body, and line connection channels are smooth;

after drilling the lining canal body 11 and mounting the temperature sensor 22, sleeving the five groups of single-mode bend-insensitive optical fibers 211 on the lining canal body 11 to detect the initial center wavelength $\lambda_B$ of the pre-tightening force, avoiding detecting the deformation of the lining canal body 11 in a process of drilling and mounting the temperature sensor 22;

wherein the temperature sensor 22 preferably adopts a high-precision contact resistance temperature sensor with a measuring range of −200° C. to 350° C., and the four temperature sensors 22 detects the initial temperature of the lining canal body 11;

the initial temperature refers to a temperature inside the lining canal body 11 after placing the lining canal body 11 in a predetermined environment;

the predetermined environment is provided by a closed test box, and the predetermined environment refers to a simulated outdoor low-temperature environment in Northern China and is preferably −30° C. to 20° C.;

S2, configuring the temperature control device to provide a predetermined temperature for the lining canal body 11, wherein the temperature of the lining canal body 11 changes from an upper end and a lower end to a center;

performing, by the upper temperature-changing box 12 and the lower temperature-changing box 13, refrigeration to provide a predetermined temperature for the upper end and the lower end of the lining canal body 11;

wherein the predetermined temperature refers to surface temperature of lining concrete and frozen soil temperature in the simulated severe cold region;

the upper temperature-changing box 12 has a temperature of −25° C. to −30° C. and the lower temperature-changing box 13 has a temperature of 1° C. in a freezing process;

in the freezing process, the anhydrous ethanol continuously circulates in the upper temperature-changing box 12 and the lower temperature-changing box 13, to avoid slow refrigeration due to a refrigeration medium staying in the upper temperature-changing box 12 and the lower temperature-changing box 13, and a total refrigeration time is 5 hours and the predetermined ambient temperature is −5° C. to −10° C.;

in a melting process, the upper temperature-changing box 12 has a temperature of 10° C. to 15° C., a circulation channel of the lower temperature-changing box 13 is closed, only a circulation channel of the upper temperature-changing box 12 is reserved, and the heated anhydrous ethanol continuously circulates in the upper temperature-changing box 12, so as to avoid slow heating due to a temperature rising medium staying in the upper temperature-changing box; a total temperature rising time is 3 hours and the predetermined ambient temperature is 20° C. to 25° C. in the melting process;

5 h of freezing and 3 h of thawing are taken as one freeze-thaw cycle, and multiple freeze-thaw cycles are measured and determined;

S3, detecting after temperature changing, specifically comprising:

detecting, by the four temperature sensors 22, a temperature change $\Delta T_i$ of different regions of the lining canal body 11;

wherein the lining canal body 11 cools from the upper end and the lower end towards the center, thus the four temperature sensors 22 detect a temperature gradient change of the lining canal body 11 from the upper end and the lower end to the center;

recording, by the FBG demodulator 213, a central wavelength changing value $\Delta\lambda_{Bi}$ of the five groups of single-mode bend-insensitive optical fibers 211 caused by temperature change, and recording, by the FBG demodulator 213, a strain changing value $\varepsilon_i$ of the plurality of groups of single-mode bend-insensitive optical fibers 211;

detecting, by the five groups of single-mode bend-insensitive optical fibers 211, the central wavelength changing value $\Delta\lambda_{Bi}$ and the strain changing value $\varepsilon_i$ of the lining canal body 11 in different regions, so as to determine a weak part of the lining canal body 11;

S4, obtaining a frost-heaving strain parameter:

calculating a transverse frost-heaving strain of the optical fiber:

$$\frac{\Delta\lambda_{Bi}}{\lambda_B} = (\alpha + \xi)\Delta T_i + (1 - p_e)\varepsilon_i$$

wherein $\varepsilon_i$ is a detection value of the frost-heaving strain of the single-mode bend-insensitive optical fibers (211) in different regions, $\alpha$ is a thermal expansion coefficient of the single-mode bend-insensitive optical fiber 211, $\xi$ is a thermo-optic coefficient of the single-mode bend-insensitive optical fiber 211, and $p_e$ is an effective photoelastic coefficient of the single-mode bend-insensitive optical fiber 211;

a transverse frost-heaving strain $\varepsilon_{ai}$:

$$\varepsilon_{ai} = \varepsilon_i - \varepsilon'$$

wherein $\varepsilon_{ai}$ is an actual value of the transverse frost-heaving strain of the lining canal body (11) in different regions, $\varepsilon_i$ is a detection value of a transverse frost-heaving strain of the single-mode bend-insensitive optical fiber (211) in different regions, and $\varepsilon'$ is an error value detected by the temperature compensation device (212);

obtaining a vertical frost-heaving strain parameter of the lining canal body (11) by the displacement sensor 321 provided at the second end of the fixing rod (32).

The above description is only preferred embodiments of the present invention, and is not intended to limit the technical scope of the present invention, so that any minor amendments, equivalent changes and modifications made to the above embodiments according to the technical spirit of the present invention belong to the scope of the technical solution of the present invention.

What is claimed is:

1. A device for testing temperature conduction and frost-heaving strain of a concrete lining canal, comprising:
   a frost-heaving device comprising a lining canal body and a temperature control device, wherein
   the temperature control device is configured to provide a predetermined temperature for the lining canal body;
   a detection device comprising a transverse deformation detection device, a vertical displacement detection device and a plurality of temperature sensors, wherein
   the transverse deformation detection device is configured to detect a transverse frost-heaving strain parameter of the lining canal body at the predetermined temperature;
   the vertical displacement detection device is configured to detect a vertical frost-heaving strain parameter of the lining canal body at the predetermined temperature;
   the plurality of temperature sensors are arranged along an axial direction of the lining canal body;
   the plurality of temperature sensors are embedded inside the lining canal body; and
   the plurality of temperature sensors are configured to detect temperature conduction performance of the lining canal body at the predetermined temperature,
   wherein the temperature control device is a refrigeration box comprising an upper temperature-changing box and a lower temperature-changing box,
   the upper temperature-changing box and the lower temperature-changing box are tightly fixed at an upper end and a lower end of the lining canal body, respectively.

2. The device according to claim 1, wherein a displacement-constraint device is connected between the upper temperature-changing box and the lower temperature-changing box;
   the displacement-constraint device comprises: a first connecting rod, a second connecting rod and a sliding rod;
   a first end of the first connecting rod is fixedly connected to the lower temperature-changing box, and a second end of the first connecting rod is fixedly connected to a first end of the sliding rod;
   a first end of the second connecting rod is fixedly connected to the upper temperature-changing box, and a second end of the second connecting rod is slidably connected to a second end of the sliding rod.

3. The device according to claim 1, wherein the vertical displacement detection device comprises: a supporting rod, a fixing rod and a displacement sensor;
   a first end of the fixing rod is fixedly connected to a top end of the supporting rod; a second end of the fixing rod is fixedly connected to the displacement sensor, and the displacement sensor is abutted against and fitted with a top end of the upper temperature-changing box.

4. A device for testing temperature conduction and frost-heaving strain of a concrete lining canal, comprising:
   a frost-heaving device comprising a lining canal body and a temperature control device, wherein
   the temperature control device is configured to provide a predetermined temperature for the lining canal body;
   a detection device comprising a transverse deformation detection device, a vertical displacement detection device and a plurality of temperature sensors, wherein
   the transverse deformation detection device is configured to detect a transverse frost-heaving strain parameter of the lining canal body at the predetermined temperature;
   the vertical displacement detection device is configured to detect a vertical frost-heaving strain parameter of the lining canal body at the predetermined temperature;
   the plurality of temperature sensors are arranged along an axial direction of the lining canal body;
   the plurality of temperature sensors are embedded inside the lining canal body; and
   the plurality of temperature sensors are configured to detect temperature conduction performance of the lining canal body at the predetermined temperature,
   wherein the transverse deformation detection device comprises: a plurality of groups of single-mode bend-insensitive optical fibers, a temperature compensation device and a Fiber Bragg Grating (FBG) demodulator;
   the plurality of groups of single-mode bend-insensitive optical fibers are tightly sleeved on an overall outside of the lining canal body, and the plurality of groups of single-mode bend-insensitive optical fibers are electrically connected to the FBG demodulator;
   the temperature compensation device is arranged inside the lining canal body and is electrically connected to the FBG demodulator.

5. A method for testing temperature conduction and frost-heaving strain of a concrete lining canal, wherein the method is applied to a device for testing temperature conduction and frost-heaving strain of a concrete lining canal, the device comprising: a frost-heaving device comprising a lining canal body and a temperature control device, wherein the temperature control device is configured to provide a predetermined temperature for the lining canal body: a detection device comprising a transverse deformation detection device, a vertical displacement detection device and a plurality of temperature sensors, wherein the transverse deformation detection device is configured to detect a transverse frost-heaving strain parameter of the lining canal body at the predetermined temperature; the vertical displacement detection device is configured to detect a vertical frost-heaving strain parameter of the lining canal body at the predetermined temperature; the plurality of temperature sensors are arranged along an axial direction of the lining canal body; the plurality of temperature sensors are embedded inside the lining canal body; and the plurality of temperature sensors are configured to detect temperature conduction performance of the lining canal body at the predetermined temperature, the method comprising:
   S1, performing an initial detection, specifically comprising:
   detecting, by an FBG demodulator, an initial center wavelength $\lambda_B$ of a pre-tightening force of a plurality of groups of single-mode bend-insensitive optical fibers sleeved on the lining canal body;
   detecting, by the plurality of temperature sensors, an initial temperature of the lining canal body;
   S2, configuring the temperature control device to provide the predetermined temperature for the lining canal body, specifically comprising:
   performing, by an upper temperature-changing box and an lower temperature-changing box, refrigeration to provide the predetermined temperature for an upper end and a lower end of the lining canal body;
   S3, detecting after temperature changing, specifically comprising:
   detecting, by the plurality of temperature sensors, a temperature change $\Delta T_i$ of different regions of the lining canal body;
   detecting, by the FBG demodulator, a central wavelength changing value $\Delta\lambda_{Bi}$ of the plurality of groups of single-mode bend-insensitive optical fibers caused by the temperature changing;

detecting, by the FBG demodulator, a strain changing value si of the plurality of groups of single-mode bend-insensitive optical fibers;

detecting, by a displacement sensor, a vertical displacement change of the lining canal body;

S4, obtaining a frost-heaving strain parameter:

calculating a transverse frost-heaving strain of the single-mode bend-insensitive optical fibers:

$$\frac{\Delta\lambda_{Bi}}{\lambda_B} = (\alpha + \xi)\Delta T_i + (1 - p_e)\varepsilon_i$$

wherein $\varepsilon_i$ is a detection value of the transverse frost-heaving strain of the single-mode bend-insensitive optical fibers in the different regions, $\alpha$ is a thermal expansion coefficient of the single-mode bend-insensitive optical fibers, $\xi$ is a thermo-optic coefficient of the single-mode bend-insensitive optical fibers, and $p_e$ is an effective photoelastic coefficient of the single-mode bend-insensitive optical fibers;

calculating a transverse frost-heaving strain $\varepsilon_{ai}$ of the lining canal body:

$$\varepsilon_{ai} = \varepsilon_i - \varepsilon'$$

wherein $\varepsilon_{ai}$ is an actual value of the transverse frost-heaving strain of the lining canal body in the different regions, $\varepsilon_i$ is the detection value of the frost-heaving strain of the single-mode bend-insensitive optical fibers in the different regions, and $\varepsilon'$ is an error value detected by a temperature compensation device;

obtaining a vertical frost-heaving strain parameter of the lining canal body by the displacement sensor provided at a second end of a fixing rod.

6. The method according to claim 5, wherein in the device, the temperature control device is a refrigeration box comprising the upper temperature-changing box and the lower temperature-changing box, the upper temperature-changing box and the lower temperature-changing box are tightly fixed at the upper end and the lower end of the lining canal body, respectively.

7. The method according to claim 6, wherein in the device, a displacement-constraint device is connected between the upper temperature-changing box and the lower temperature-changing box;

the displacement-constraint device comprises: a first connecting rod, a second connecting rod and a sliding rod;

a first end of the first connecting rod is fixedly connected to the lower temperature-changing box, and a second end of the first connecting rod is fixedly connected to a first end of the sliding rod;

a first end of the second connecting rod is fixedly connected to the upper temperature-changing box, and a second end of the second connecting rod is slidably connected to a second end of the sliding rod.

8. The method according to claim 6, wherein in the device, the vertical displacement detection device comprises: a supporting rod, the fixing rod and the displacement sensor;

a first end of the fixing rod is fixedly connected to a top end of the supporting rod; the second end of the fixing rod is fixedly connected to the displacement sensor, and the displacement sensor is abutted against and fitted with a top end of the upper temperature-changing box.

9. The method according to claim 5, wherein in the device, the transverse deformation detection device comprises: the plurality of groups of single-mode bend-insensitive optical fibers, the temperature compensation device and the FBG demodulator;

the plurality of groups of single-mode bend-insensitive optical fibers are tightly sleeved on an overall outside of the lining canal body, and the plurality of groups of single-mode bend-insensitive optical fibers are electrically connected to the FBG demodulator;

the temperature compensation device is arranged inside the lining canal body and is electrically connected to the FBG demodulator.

\* \* \* \* \*